US010621695B2

(12) United States Patent
Schroers et al.

(10) Patent No.: US 10,621,695 B2
(45) Date of Patent: Apr. 14, 2020

(54) VIDEO SUPER-RESOLUTION USING AN ARTIFICIAL NEURAL NETWORK (71) Applicant: Disney Enterprises, Inc., Burbank, CA (US)

(72) Inventors: Christopher Schroers, Zürich (CH); Yifan Wang, Zurich (CH); Federico Perazzi, Zurich (CH); Brian McWilliams, Zurich (CH); Alexander Sorkine Hornung, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 218 days.

(21) Appl. No.: 15/886,625

(22) Filed: Feb. 1, 2018

(65) Prior Publication Data

US 2019/0130530 A1 May 2, 2019

Related U.S. Application Data (60) Provisional application No. 62/579,668, filed on Oct. 31, 2017.

(51) Int. Cl.
G06T 3/40 (2006.01)

(52) U.S. Cl.
CPC .......... G06T 3/4046 (2013.01); G06T 3/4007 (2013.01); G06T 3/4053 (2013.01); G06T 2207/10016 (2013.01); G06T 2207/20081 (2013.01)

(58) Field of Classification Search
None
See application file for complete search history.

(56) References Cited

U.S. PATENT DOCUMENTS

| 7,362,374 | B2* | 4/2008 | Holt | G06T 7/20 |
| | | | | 348/446 |
| 9,571,786 | B1* | 2/2017 | Zimmer | G06T 3/4084 |
| 9,911,215 | B1* | 3/2018 | Hornung | G06T 11/60 |
| 10,491,856 | B2* | 11/2019 | Schroers | H04N 7/0135 |
| 2006/0200253 | A1* | 9/2006 | Hoffberg | G05B 15/02 |
| | | | | 700/19 |

(Continued)

OTHER PUBLICATIONS

C. Ledig, L. Theis, F. Huszar, J. Caballero, A. P. Aitken, A. Tejani, J. Totz, Z. Wang, and W. Shi. "Photo-Realistic Single Image Super-Resolution Using a Generative Adversarial Network." CoRR, abs/1609.04802, 2016.

(Continued)

Primary Examiner — Nancy Bitar
(74) Attorney, Agent, or Firm — Farjami & Farjami LLP (57) ABSTRACT According to one implementation, a video processing system includes a computing platform having a hardware processor and a system memory storing a software code including an artificial neural network (ANN). The hardware processor is configured to execute the software code to receive a first video sequence having a first display resolution, and to produce a second video sequence based on the first video sequence using the ANN. The second video sequence has a second display resolution higher than the first display resolution. The ANN is configured to provide sequential frames of the second video sequence that are temporally stable and consistent in color to reduce visual flicker and color shifting in the second video sequence.

20 Claims, 4 Drawing Sheets (56) References Cited

U.S. PATENT DOCUMENTS

| | | | |
|---|---|---|---|
| 2014/0072228 A1* | 3/2014 | Rubinstein | G06T 7/207 |
| | | | 382/197 |
| 2014/0072229 A1* | 3/2014 | Wadhwa | G06K 9/481 |
| | | | 382/197 |
| 2016/0191159 A1* | 6/2016 | Aoyama | H04N 21/436 |
| | | | 398/172 |
| 2018/0293711 A1* | 10/2018 | Vogels | G06K 9/40 |
| 2018/0365554 A1* | 12/2018 | van den Oord | G10L 13/00 |
| 2019/0012526 A1* | 1/2019 | Guo | G06K 9/00288 |

OTHER PUBLICATIONS

J. J. Zhao, M. Mathieu, and Y. LeCun. "Energy-Based Generative Adversarial Network." *CoRR*, abs/1609.03126, 2016.

\* cited by examiner

VIDEO SUPER-RESOLUTION USING AN ARTIFICIAL NEURAL NETWORK

RELATED APPLICATION(S)

The present application claims the benefit of and priority to a pending Provisional Patent Application Ser. No. 62/579,668, filed Oct. 31, 2017, and titled "Generative Deep Neural Network Approach to Video Super-Resolution," which is hereby incorporated fully by reference into the present application.

BACKGROUND

Spatial up-sampling of discretely sampled visual data, often referred to as super-resolution, has applications that are in considerable demand at present. For example, super-resolution may be desirable for use in converting high-definition (HD) video content, e.g., 1K or 2K resolution video, for viewing on the increasingly popular and commercially available Ultra HD 4K video displays, as well as the next generation of 8K video displays.

Conventional methods for performing super-resolution typically rely on redundancy and explicit motion estimation between video frames to effectively reconstruct a higher resolution signal from many lower resolution measurements. Although such conventional approaches can in principle result in a correct reconstruction of missing detail, their reliance on the quality of estimated motion between frames limits their ability to up-sample unconstrained real-world video with rapid motion, blur, occlusions, drastic appearance changes, and/or presenting other common video processing challenges.

SUMMARY

There are provided systems and methods for performing video super-resolution using an artificial neural network, substantially as shown in arid/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, spatial up-sampling of discretely sampled visual data, often referred to as super-resolution, has applications that are in considerable demand at present. For example, super-resolution may be desirable for use in converting high-definition (HD) video content, e.g., 1K or 2K resolution video, for viewing on the increasingly popular and commercially available Ultra HD 4K video displays, as well as the next generation of 8K video displays.

However, and as also stated above, conventional methods for performing super-resolution typically rely on redundancy and explicit motion estimation between video frames to effectively reconstruct a higher resolution signal from many lower resolution measurements. Although such conventional approaches can in principle result in a correct reconstruction of missing detail, their reliance on the quality of estimated motion between frames limits their ability to up-sample unconstrained real-world video.

The present application discloses a solution for performing video super-resolution using an artificial neural network (ANN) that overcomes the drawbacks and deficiencies in the conventional art. The present solution utilizes individual still images, rather than video, to train the ANN to up-sample a received video sequence to a higher resolution video sequence having sequential video frames that are temporally stable and consistent in color. As result, the present solution advantageously enables super-resolution of unconstrained real-world video including rapid motion, blur, occlusions, drastic appearance changes, and/or presenting other common video processing challenges, to produce higher resolution video that is perceptually free of visual flicker and color shifting.

It is noted that, as defined in the present application, an ANN is a machine learning engine designed to progressively improve its performance of a specific task. In various implementations, an ANN may engage in supervised or unsupervised machine learning. In some use cases, it may be advantageous or desirable to implement an ANN as a competitive neural network (CNN), such as a generative adversarial network (GAN) including a generator module and a discriminator module that compete with one another. Moreover, in some implementations of the present inventive principles, an ANN may take the form of an energy-based GAN (EBGAN) in which the generator module is expressed using an energy function.

Figure 1:
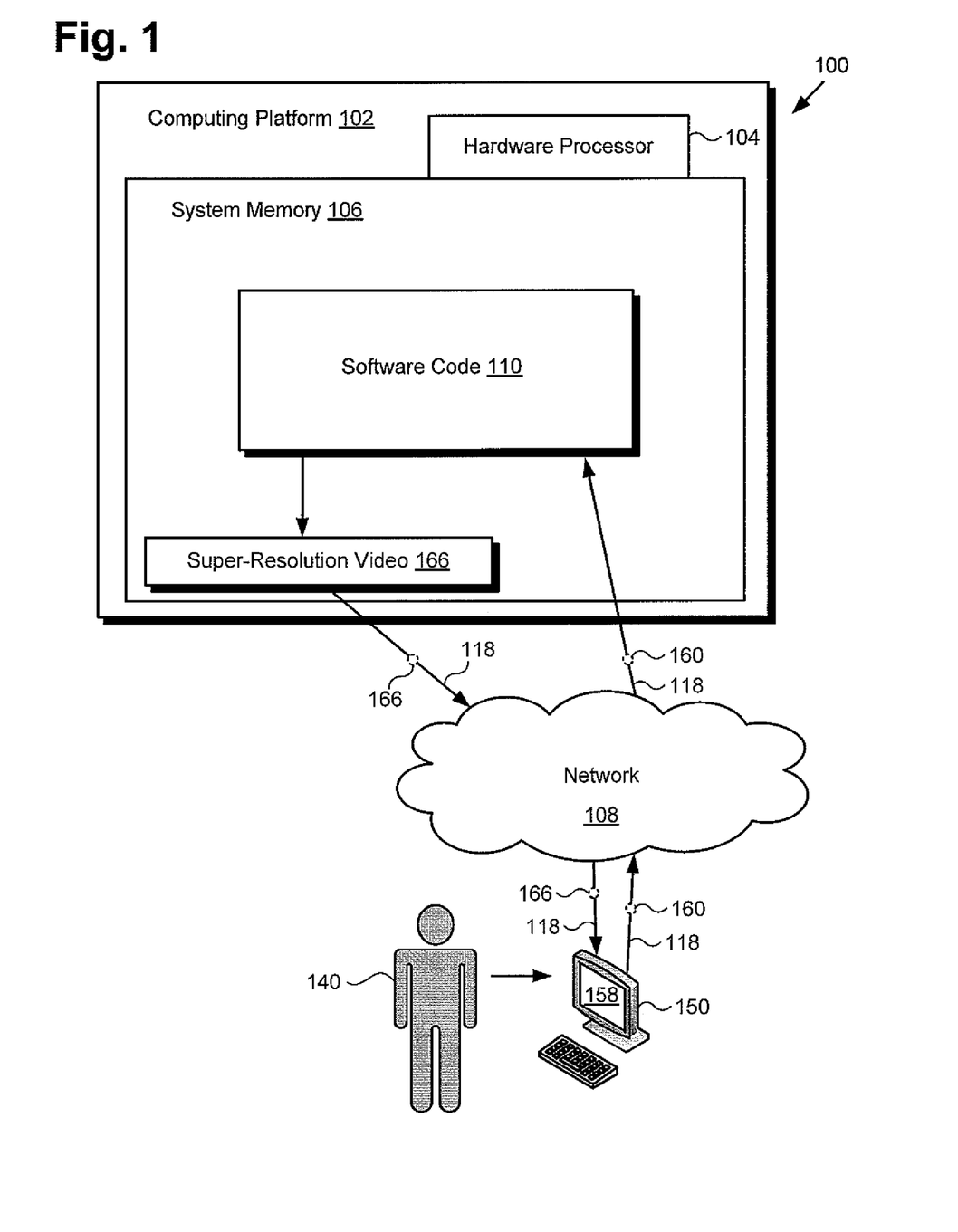
FIG. 1 shows a diagram of an exemplary system for performing video super-resolution using an artificial neural network (ANN), according to one implementation.

FIG. 1 shows a diagram of an exemplary video processing system for performing video super-resolution using an ANN, according to one implementation. As shown in FIG. 1, video processing system 100 includes computing platform 102 having hardware processor 104, and system memory 106 implemented as a non-transitory storage device. According to the present exemplary implementation, system memory 106 stores software code 110.

As further shown in FIG. 1, video processing system 100 is implemented within a use environment including communication network 108, user system 150 including display 158, and user 140 utilizing user system 150. Also shown in FIG. 1 are network communication links 118 interactively connecting user system 150 and video processing system 100 via communication network 108, first video sequence 160, and second, super-resolution, video sequence 166 produced using software code 110.

It is noted that although FIG. 1 depicts software code 110 as being stored in its entirety in memory 106, that representation is merely provided as an aid to conceptual clarity. More generally, video processing system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within video processing system 100. Thus, it is to be understood that various portions of software code 110, such as one or more of the features described below by reference to FIG. 4, may be stored and/or executed using the distributed memory and/or processor resources of video processing system 100.

According to the implementation shown by FIG. 1, user 140 may utilize user system 150 to interact with video processing system 100 over communication network 108. In one such implementation, video processing system 100 may correspond to one or more web servers, accessible over a packet-switched network such as the Internet, for example. Alternatively, video processing system 100 may correspond to one or more computer servers supporting a local area network (LAN), or included in another type of limited distribution network.

Although user system 150 is shown as a desktop computer in FIG. 1, that representation is also provided merely as an example. More generally, user system 150 may be any suitable mobile or stationary computing device or system that implements data processing capabilities sufficient to provide a user interface, support connections to communication network 108, and implement the functionality ascribed to user system 150 herein. For example, in other implementations, user system 150 may take the form of a laptop computer, tablet computer, or smartphone, for example. User 140 may utilize user system 150 to interact with video processing system 100 to use software code 110, executed by hardware processor 104, to produce super-resolution video sequence 166 from video sequence 160.

It is noted that, in various implementations, second, super-resolution, video sequence 166, when produced using software code 110, may be stored in system memory 106 and/or may be copied to non-volatile storage (not shown in FIG. 1). Alternatively, or in addition, as shown in FIG. 1, in some implementations, second, super-resolution, video sequence 166 may be sent to user system 150 including display 158, for example by being transferred via network communication links 118 of communication network 108. It is further noted that display 158 may take the form of an Ultra HD display, such as a 4K or 8K video display, implemented as a liquid crystal display (LCD), a light-emitting diode (LED) display, an organic light-emitting diode (OLED) display, or another suitable display screen that performs a physical transformation of signals to light.

Figure 2:
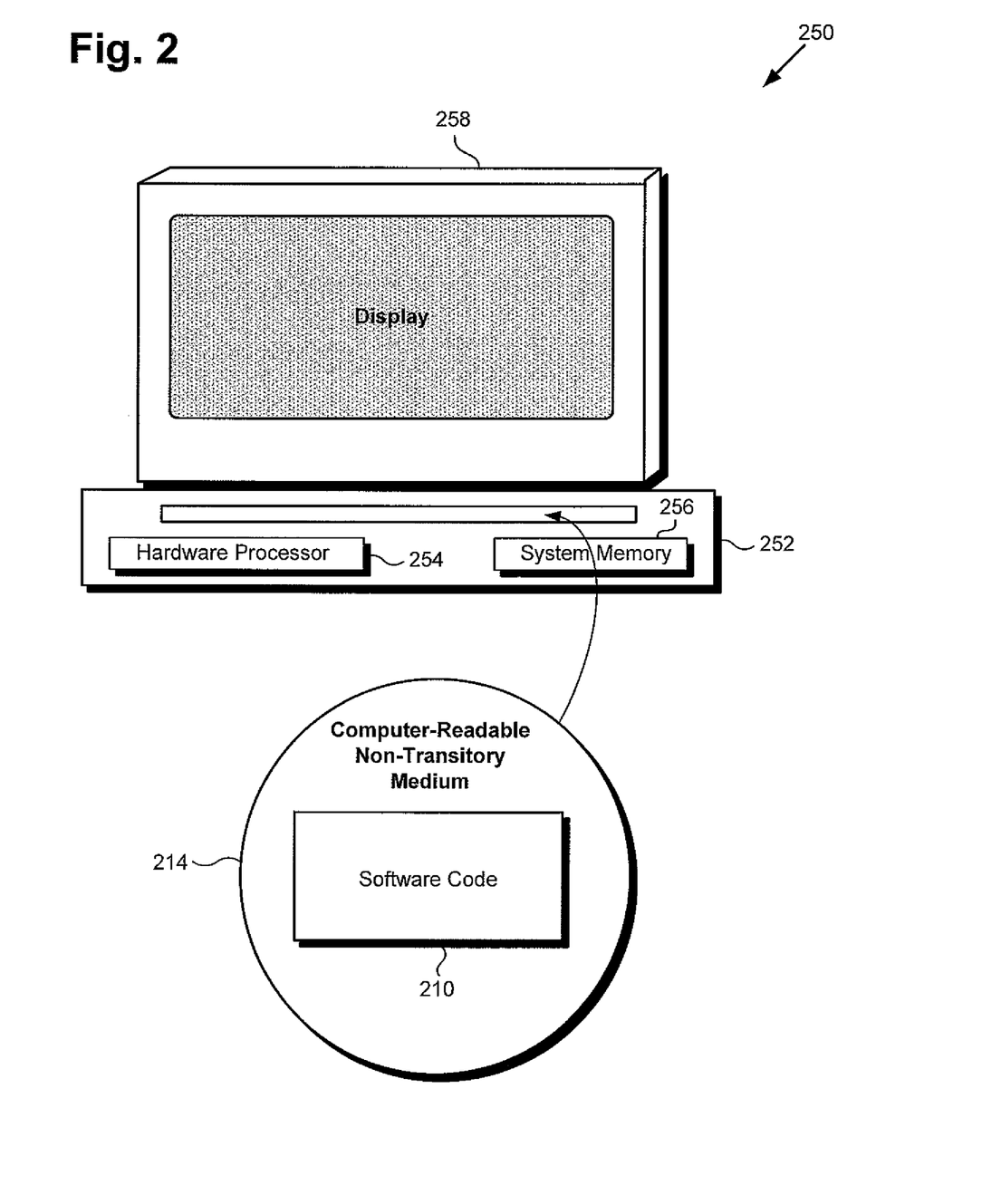
FIG. 2 shows an exemplary system and a computer-readable non-transitory medium including instructions for performing video super-resolution using an ANN, according to one implementation.

FIG. 2 shows exemplary system 250 and computer-readable non-transitory medium 214 including instructions for performing video super-resolution using an ANN, according to one implementation. System 250 includes computing platform 252 having hardware processor 254 and system memory 256, interactively linked to display 258. Display 258 may take the form of an Ultra HD display, such as a 4K or 8K video display, implemented as an LCD, LED display, an OLED display, or another suitable display screen that performs a physical transformation of signals to light.

System 250 including computing platform 252 having hardware processor 254 and system memory 256 corresponds in general to video processing system 100 including computing platform 102 having hardware processor 104 and system memory 106, in FIG. 1. In addition, system 250 can correspond in general to user system 150, in FIG. 1. Consequently, although not shown explicitly shown in FIG. 1, user system 150 may include features corresponding to computing platform 252 having hardware processor 254 and system memory 256 storing software code 210.

Also shown in FIG. 2 is computer-readable non-transitory medium 214 having software code 210 stored thereon. The expression "computer-readable non-transitory medium," as used in the present application, refers to any medium, excluding a carrier wave or other transitory signal, that provides instructions to hardware processor 254 of computing platform 252. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 214 provides software code 210 for execution by hardware processor 254 of computing platform 252. Software code 210 corresponds in general to software code 110, in FIG. 1, and is capable of performing all of the operations attributed to that corresponding feature by the present disclosure.

Figure 3:
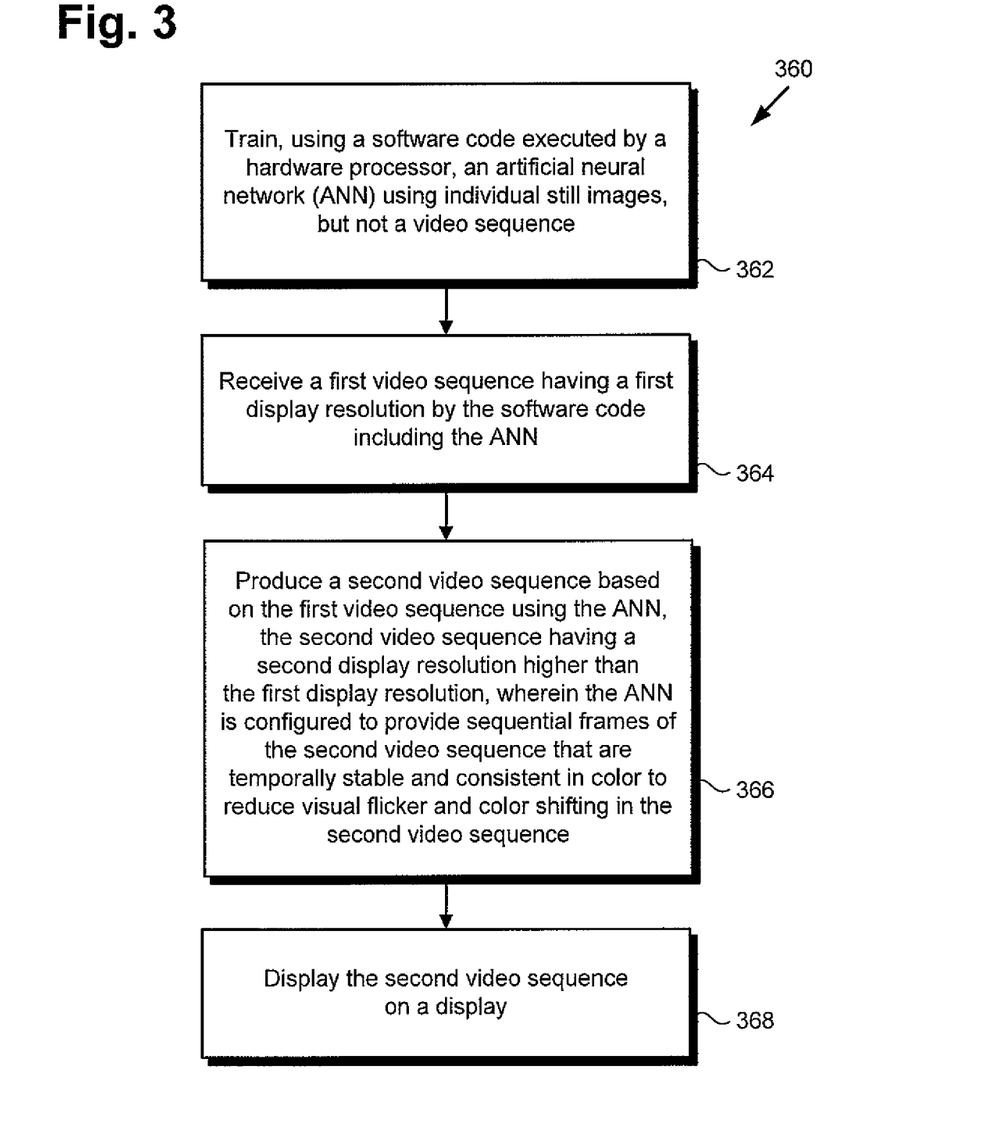
FIG. 3 shows a flowchart presenting an exemplary method for performing video super-resolution using an ANN, according to one implementation.

The functionality of software code 110/210 will be further described by reference to FIG. 3 in combination with FIGS. 1, 2, and 4. FIG. 3 shows flowchart 360 presenting an exemplary method for use by a system, such as video processing system 100 or user system 150 in FIG. 1, or system 250 in FIG. 2, to perform video super-resolution using an ANN. With respect to the method outlined in FIG. 3, it is noted that certain details and features have been left out of flowchart 360 in order not to obscure the discussion of the inventive features in the present application.

Figure 4:
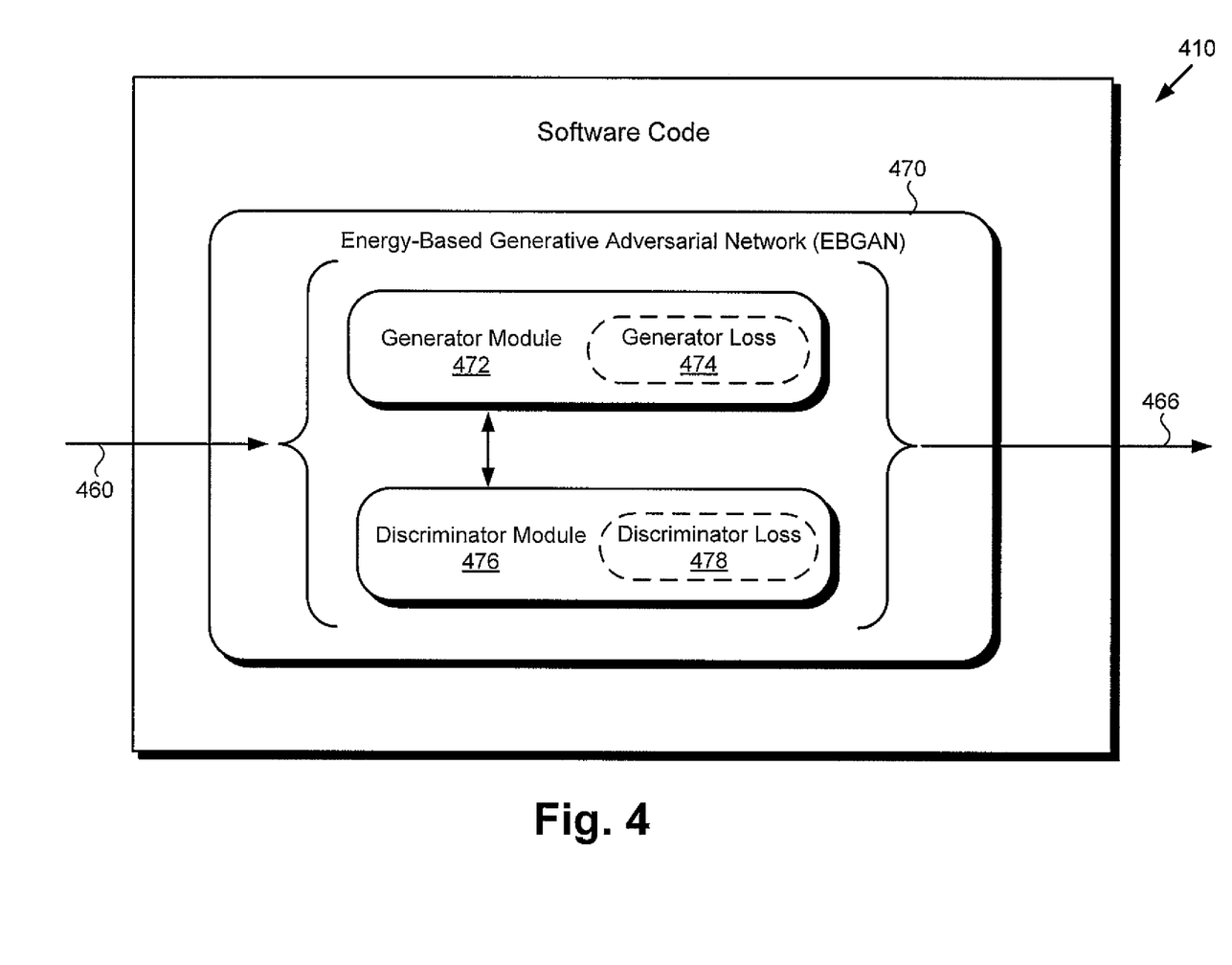
FIG. 4 shows an exemplary diagram of a software code suitable for execution by a hardware processor of the systems shown by FIGS. 1 and 2, according to one implementation.

FIG. 4 shows exemplary software code 410 suitable for execution by hardware processor 104/254 of the systems shown by FIGS. 1 and 2, according to one implementation. As shown in FIG. 4, software code 410 may include an ANN, to depicted as EBGAN 470 for exemplary purposes, which itself may further include generator module 472 and discriminator module 476. Also shown in FIG. 4 are first video sequence 460, generator loss 474 corresponding to generator module 472, discriminator loss 478 corresponding to discriminator module 474, and second, super-resolution, video sequence 466.

First video sequence 460 and second, super-resolution, video sequence 466 correspond respectively in general to first video sequence 160 and second, super-resolution, video sequence 166, in FIG. 1, and those corresponding features may share any of the characteristics attributed to either corresponding feature by the present disclosure. In addition, software code 410 corresponds in general to software code 110/210, in FIGS. 1 and 2, and those corresponding features may share the characteristics attributed to any of the corresponding features by the present disclosure. That is to say, like software code 410, software code 110/210 may include an ANN corresponding to EBGAN 470 and having generator module 472 and corresponding generator loss 474, as well as discriminator module 476 and corresponding discriminator loss 478.

Referring now to FIG. 3 in combination with FIGS. 1, 2, and 4, flowchart 360 begins with training ANN/EBGAN 470 using multiple individual still images, but not a video sequence (action 362). By way of example, and in the interests of conceptual clarity, the method outlined by flowchart 360 will be described with specific reference to implementations in which the ANN included in software code 110/210/410 takes the form of EBGAN 470. EBGAN 470 may be trained using software code 110/210/410, executed by hardware processor 104/254, as described below.

Generator module 472 can be trained using mean-squared-error (MSE) loss, as known in the art, for 20 epochs before starting adversarial training. According to various implementations of the present inventive principles, adversarial training may be performed for approximately 50 epochs using the following generator loss equation for expressing generator loss 474:

$$\mathcal{L}_G = \gamma_{adv}\mathcal{L}_{adv} + \gamma_{vgg}\mathcal{L}_{vgg} + \gamma_{lr}\mathcal{L}_{lr} + \gamma_{tv}\mathcal{L}_{tv},  \quad \text{(Equation 1)}$$

where $\mathcal{L}_{adv}$ is an adversarial loss factor, $\mathcal{L}_{vgg}$ is a perceptual loss factor, $\mathcal{L}_{lr}$ is a content loss factor, and $\mathcal{L}_{tv}$ is a total variation loss factor that penalizes high frequency patterns and is known in the art. It is noted that $\gamma_{adv}$, $\gamma_{vgg}$, $\gamma_{lr}$, and $\gamma_{tv}$ are the respective adversarial loss, perceptual loss, content loss, and total variation loss weighting terms, which may be adjusted heuristically. It is further noted that the loss factors $\mathcal{L}_{adv}$, $\mathcal{L}_{vgg}$, and $\mathcal{L}_{lr}$ are described in greater detail below.

In contrast to a GAN, which in a super-resolution application typically predicts the probability that an input image X is real, i.e., p(real|X), EBGAN discriminator module 474 learns an energy function that describes the real image manifold, assigning high energy to real images X, and low energy to super-resolution images $\hat{X}$. The equation describing discriminator loss 478 may be expressed as:

$$\mathcal{L}_D = D(X) + \max(0, m - D(\hat{X})) \quad \text{(Equation 2)}$$

and $\mathcal{L}_{adv}$ takes the form:

$$\mathcal{L}_{adv} = D(\hat{X}), \quad \text{(Equation 3)}$$

where m is a constant margin, and the energy value D(X) is the reconstruction error based on a chosen norm, i.e.:

$$D(X) = \frac{1}{N} \sum_{0 < i < N} \|Dec(Enc(X))_i - X_i\| \quad \text{(Equation 4)}$$

For the purposes of training EBGAN 470, high-resolution patches may be obtained by randomly cropping a 96×96 pixel patch from each individual still image used as a training image, and then randomly applying horizontal and vertical flips. Low-resolution patches can be created by blurring the high-resolution patches with Gaussian kernel and bicubic interpolation, where the Gaussian sigma is intentionally set large, e.g., ($\sigma = \sqrt{2}$), in order to avoid aliasing in the input. In addition, the Gaussian sigma may be perturbed with a random noise $\eta \sim \mathcal{N}(0, 0.1)$ during training to increase the robustness of EBGAN 470 with respect to the down-sampling kernel. The high-resolution and low-resolution pairs of training patches may then be shifted to [−1, 1] before being used by generator module 472. In addition, the precision of the high-resolution and low-resolution patches may be reduced, such as by a factor of $$\frac{1}{127.5},$$

so as to align the with the data precision of common image formats.

The architecture of discriminator module 476 may utilize Nearest Neighbor+convolution, rather than transpose deconvolution, to avoid checkerboard patterns in the reconstructed image, and may utilize a leaky rectified linear unit (leaky relu) in place of a conventional rectified linear unit. One exemplary implementation of the architecture of discriminator module 476 is provided as Table 1:

| Enc | conv(64, k = 4, s = 2) | Dec | resize + conv(256, k = 4, s = 1) |
|---|---|---|---|
|  | bn + lrelu |  | bn + lrelu |
|  | conv(128, k = 4, s = 2) |  | resize + conv(128, k = 4, s = 1) |
|  | bn + lrelu |  | bn + lrelu |
|  | conv(256, k = 4, s = 2) |  | resize + conv(64, k = 4, s = 1) |
|  | bn + lrelu |  | bn + lrelu |
|  | conv(512, k = 4, s = 2) |  | resize + conv(3, k = 4, s = 1) |
|  | bn + lrelu |  | tanh, | where conv(N, k=K, s=S) denotes a two-dimensional convolution layer with N output channels, kernel size K, and stride S. All convolution layers, except the last, are followed with batch normalization and leaky relu.

Referring once again to FIG. 3 in combination with FIGS. 1, 2, and 4, flowchart 360 continues with receiving first video sequence 160/460 having a first display resolution (action 364). By way of example, user 140 may utilize user system 150 to interact with video processing system 100, or may interact directly with system 250, in order to produce second, super-resolution video sequence 166/466 based on first video sequence 160/460. As shown by FIG. 1, in one implementation, user 140 may do so by transmitting first video sequence 160/460 from user system 150 to video processing system 100 via communication network 108 and network communication links 118. Alternatively, first video sequence 160/460 may be received from a third party source of video content, or may be stored in system memory 106/256. First video sequence 160/460 may be received by software code 110/210/410 including EBGAN 470, executed by hardware processor 104/254.

First video sequence 160/460 is typically a video sequence including multiple video frames. First video sequence 160/460 may be HD video, for example, having a first display resolution of from approximately 1K resolution to approximately 2K resolution. Moreover, first video sequence 160/460 may be video content including one or more of rapid motion, blur, occlusions, and significant appearance changes, for example.

Flowchart 360 continues with producing second, super-resolution, video sequence 166/466 based on first video sequence 160/460 using EBGAN 470, second, super-resolution, video sequence 166/466 having a second display resolution higher than the first display resolution of first video sequence 160/460 (action 366). Furthermore, EBGAN 470 is configured to provide sequential frames of second, super-resolution, video sequence 166/466 that are temporally stable and consistent in color to reduce visual flicker and color shifting in second, super-resolution, video sequence 166/466.

With respect to the second display resolution of second, super-resolution, video sequence 166/466 relative to the first display resolution of first video sequence 160/460, it is noted that second, super-resolution, video sequence 166/466 may have a display resolution up to approximately four times higher than the display resolution of first video sequence 160/460. For example, where first video sequence 160/460 includes 1K HD video, second, super-resolution, video sequence 166/466 may be produced as 4K Ultra HD video. Furthermore, where first video sequence 160/460 includes 2K HD video, second, super-resolution, video sequence 166/466 may be produced as 8K Ultra HD video. Second, super-resolution, video sequence 166/466 having a display resolution higher than that of first video sequence 160/460, may be produced based on first video sequence 160/460 by software code 110/210/410, executed by hardware processor 104/254, and using EBGAN 470.

Given first video sequence 160/460 having a first, relatively lower, display resolution, system 100/150/250 may be designed to utilize hardware processor 104/254 to execute software code 110/210/410 including EBGAN 470 to find a direct mapping $\hat{X}=G(Y)$ to second, super-resolution, video sequence 166/466 having a second, higher display resolution. That mapping, $G(Y)$, which is provided by generator module 472, may be modeled as a deep convolutional neural network.

According to the present inventive concepts, the mapping $G(Y)$ is substantially optimized by Equation 1, introduced above, using Equation 3 above to define the adversarial loss factor $\mathcal{L}_{adv}$. Moreover, and as noted above, the total variation loss factor $\mathcal{L}_{tv}$ that penalizes high frequency patterns is known in the art. Consequently, the following discussion of generator loss 474 focuses on determination of the perceptual loss $\mathcal{L}_{vgg}$ and the content loss $\mathcal{L}_{lr}$ factors in Equation 1.

Perceptual Loss:

The perceptual loss is defined as the squared difference between the feature maps of images, $\hat{X}$, included in second, super-resolution video sequence 166/466 and their respective "ground truth" counterpart images, X, in first video sequence 160/460. That squared difference between feature maps is evaluated on a pre-trained network, such as a multi-layered Visual Geometry Group (VGG) network.

In some implementations, it may be advantageous or desirable to include mid-level VGG features, as well as high level VGG features, in determining the perceptual loss $\mathcal{L}_{vgg}$, because the mid-level VGG features can better represent non-local structural information. Moreover, including mid-level VGG features enables EBGAN 470 to provide second, super-resolution, video sequence 166/466 having sequential frames that are temporally stable to reduce visual flicker in second, super-resolution, video sequence 166/466. For example, in some implementations, EBGAN 470 can provide second, super-resolution, video sequence 166/466 for which visual flicker is imperceptible to a human viewer, such as user 140. In implementations in which mid-level features are included in the determination of perceptual loss, the perceptual loss may be expressed as Equation 5:

$$\mathcal{L}_{vgg} = \gamma_j \frac{1}{N_j} \sum_{0 \le i \le N_j} (\phi_i^j(X) - \phi_i^j(\hat{X}))^2 + \gamma_k \frac{1}{N_k} \sum_{0 \le i \le N_k} (\phi_i^k(X) - \phi_i^k(\hat{X}))^2,$$

where j, k denote two different layers of the VGG network, e.g., conv3-3 and conv5-3. It is noted that the weights $\gamma_j$ and $\gamma_k$ can be adjusted to balance texture hallucination and structure reproduction in second, super-resolution, video sequence 166/466.

Content Loss:

The VGG networks utilized in the determination of the perceptual loss are designed for image classification tasks. As a result, the filters, especially in higher layers, become increasingly insensitive to color variations and translations. Consequently, implementations of the present inventive concepts include an additional loss factor, i.e., content loss $\mathcal{L}_{lr}$, that penalizes the difference between down-sampled frames of first video sequence 160/460 and down-sampled corresponding frames of second, super-resolution, video sequence 166/466. In other words, frames of first video sequence 160/460 are down-sampled to a third display resolution lower than the first display resolution of first video sequence 160/460 and are compared to corresponding frames of second, super-resolution, video sequence 166/466 that have also been down-sampled to the same, low, third display resolution.

The motivation for determining the content loss in the manner described above is based on the reasoning that, despite hallucinated details, the down-sampled versions of respective frames of first video sequence 160/460 and second, super-resolution, video sequence 166/466 should be substantially the same. Thus, the content loss may be expressed as:

$$\mathcal{L}_{lr} = \frac{1}{N} \sum_{0 < i < N} (x_i - \hat{x}_i)^2, \qquad \text{(Equation 6)}$$

where x and $\hat{x}$ denote the down-sampled results of first video sequence 160/460 and second, super-resolution, video sequence 166/466, respectively, for which the same Gaussian blur used to generate low resolution training images is adopted, and the images are then resited with bilinear interpolation. It is noted that the blurring kernel and bilinear interpolation ensure that the desired hallucination is not directly penalized in the determination of the content loss.

The content loss factor determined using Equation 6 can ensure that the global structure and color reproduction remain consistent with the input images, i.e., first video sequence 160/460. That is to say, the content loss factor determined using Equation 6 enables EBGAN 470 to provide second, super-resolution, video sequence 166/466 having sequential frames that are consistent in color to reduce color shifting in second, super-resolution, video sequence 166/466. For example, in some implementations, EBGAN 470 can provide second, super-resolution, video sequence 166/466 for which color shifting is imperceptible to a human viewer, such as user 140.

In some implementations, it may be advantageous or desirable to use a stretched hyperbolic tangent (tanh) function as the last activation function of generator module 472. The resulting values may then be clipped outside [−1, 1] to obtain the super-resolution images of second, super-resolution, video sequence 166/466.

It is noted that, according to the present exemplary implementation, discriminator module 476 of EBGAN 470 uses the reconstruction error to express the energy E of the real data distribution $p(X) \sim e^{-E}$. In other words, lower reconstruction error corresponds to real data, while higher reconstruction error indicates like unrealistic data. Although discriminator module 476 is typically adversarially trained to be highly specialized to the present state of generator module 472, the energy estimation performed by discriminator module 476 substantially aligns with human visual perception.

According to the present exemplary implementation, discriminator module 476 is sensitive in regions with rich texture, where significant detail hallucination from adversarial training is required. In these regions, generator module 472 may create high frequency patterns that could appear unnatural. Discriminator module 476 can advantageously be used to identify such "artefacts."

Flowchart 360 can conclude with displaying super-resolution video sequence 166/466 on display 158/258 (action 368). As noted above, display 158/258 may take the form of an Ultra HD display, such as a 4K or 8K video display, implemented as an LCD, LED display, or an OLED display, for example. The displaying of super-resolution video sequence 166/466 on display 158/258 may be performed by software code 210/410, executed by hardware processor 254.

Thus, the present application discloses a solution for performing video super-resolution using an ANN, for example an EBGAN. The present solution utilizes individual still images, rather than video, to train the ANN to up-sample a first video sequence to a second, higher resolution, video sequence having sequential video frames that are temporally stable and consistent in color. As a result, the present solution advantageously enables super-resolution of unconstrained real-world video including rapid motion, blur, occlusions, drastic appearance changes, and presenting other common video processing challenges, to produce higher resolution video that is perceptually free of visual flicker and color shifting.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A video processing system comprising:
a computing platform including a hardware processor and a system memory;
a software code including an artificial neural network (ANN) stored in the system memory;
the hardware processor configured to execute the software code to:
receive a first video sequence having a first display resolution;
produce a second video sequence based on the first video sequence using the ANN, the second video sequence having a second display resolution higher than the first display resolution;
wherein the ANN is configured to provide sequential frames of the second video sequence that are temporally stable and consistent in color to reduce visual flicker and color shifting in the second video sequence.

2. The video processing system of claim 1, wherein the hardware processor is further configured to execute the software code to train the ANN through use of a plurality of individual still images, but not a video sequence.

3. The video processing system of claim 1, wherein the hardware processor is further configured to execute the software code to display the second video sequence on a display.

4. The video processing system of claim 1, wherein the ANN comprises a generative adversarial network (GAN) including a generator module and a discriminator module.

5. The video processing system of claim 4, wherein the GAN comprises an energy-based GAN (EBGAN).

6. The video processing system of claim 4, wherein a generator loss corresponding to the generator module includes a content loss factor penalizing differences between down-sampled frames of the first video sequence having a third display resolution lower than the first display resolution and down-sampled corresponding frames of the second video sequence having the third display resolution.

7. The video processing system of claim 1, wherein the second display resolution is up to approximately four times higher than the first display resolution.

8. The video processing system of claim 1, wherein the second video sequence comprises one of 4K video and 8K video.

9. A method for use by a video processing system including a computing platform having a hardware processor and a system memory storing a software code including an artificial neural network (ANN), the method comprising:
receiving, using the hardware processor, a first video sequence having a first display resolution;
producing, using the hardware processor and the ANN, a second video to sequence based on the first video sequence, the second video sequence having a second display resolution higher than the first display resolution;
wherein the ANN is configured to provide sequential frames of the second video sequence that are temporally stable and consistent in color to reduce visual flicker and color shifting in the second video sequence.

10. The method of claim 9, further comprising training the ANN, using the hardware processor, through use of a plurality of individual still images, but not a video sequence.

11. The method of claim 9, further comprising displaying, using the hardware processor, the second video sequence on a display.

12. The method of claim 9, wherein the ANN comprises a generative adversarial network (GAN) including a generator module and a discriminator module.

13. The method of claim 12, wherein the GAN comprises an energy-based GAN (EBGAN).

14. The method of claim 12, wherein a generator loss corresponding to the generator module includes a content loss factor penalizing differences between down-sampled frames of the first video sequence having a third display resolution lower than the first display resolution and down-sampled corresponding frames of the second video sequence having the third display resolution.

15. The method of claim 9, wherein the second display resolution is up to approximately four times higher than the first display resolution.

16. The method of claim 9, wherein the second video sequence comprises one of 4K video and 8K video.

17. A computer-readable non-transitory medium having stored thereon instructions and an artificial neural network (ANN), which when executed by a hardware processor, instantiate a method comprising:
- receiving a first video sequence having a first display resolution;
- producing a second video sequence based on the first video sequence using the ANN, the second video sequence having a second display resolution higher than the first display resolution;
- wherein the ANN is configured to provide sequential frames of the second video sequence that are temporally stable and consistent in color to reduce visual flicker and color shifting in the second video sequence.

18. The computer-readable non-transitory medium of claim 17, wherein the ANN comprises a generative adversarial network (GAN) including a generator module and a discriminator module.

19. The computer-readable non-transitory medium of claim 18, wherein the GAN comprises an energy-based GAN (EBGAN).

20. The computer-readable non-transitory medium of claim 18, wherein a generator loss corresponding to the generator module includes a content loss factor penalizing differences between down-sampled frames of the first video sequence having a third display resolution lower than the first display resolution and down-sampled corresponding frames of the second video sequence having the third display resolution.

* * * * *

UNITED STATES PATENT AND TRADEMARK OFFICE
CERTIFICATE OF CORRECTION

PATENT NO. : 10,621,695 B2
APPLICATION NO. : 15/886625
DATED : April 14, 2020
INVENTOR(S) : Schroers et al.

It is certified that error appears in the above-identified patent and that said Letters Patent is hereby corrected as shown below:

In the Claims

Column 10, Line 35, Claim 9: "second video to sequence" should be --second video sequence--

Signed and Sealed this
Second Day of June, 2020

Andrei Iancu
*Director of the United States Patent and Trademark Office*